UNITED STATES PATENT OFFICE.

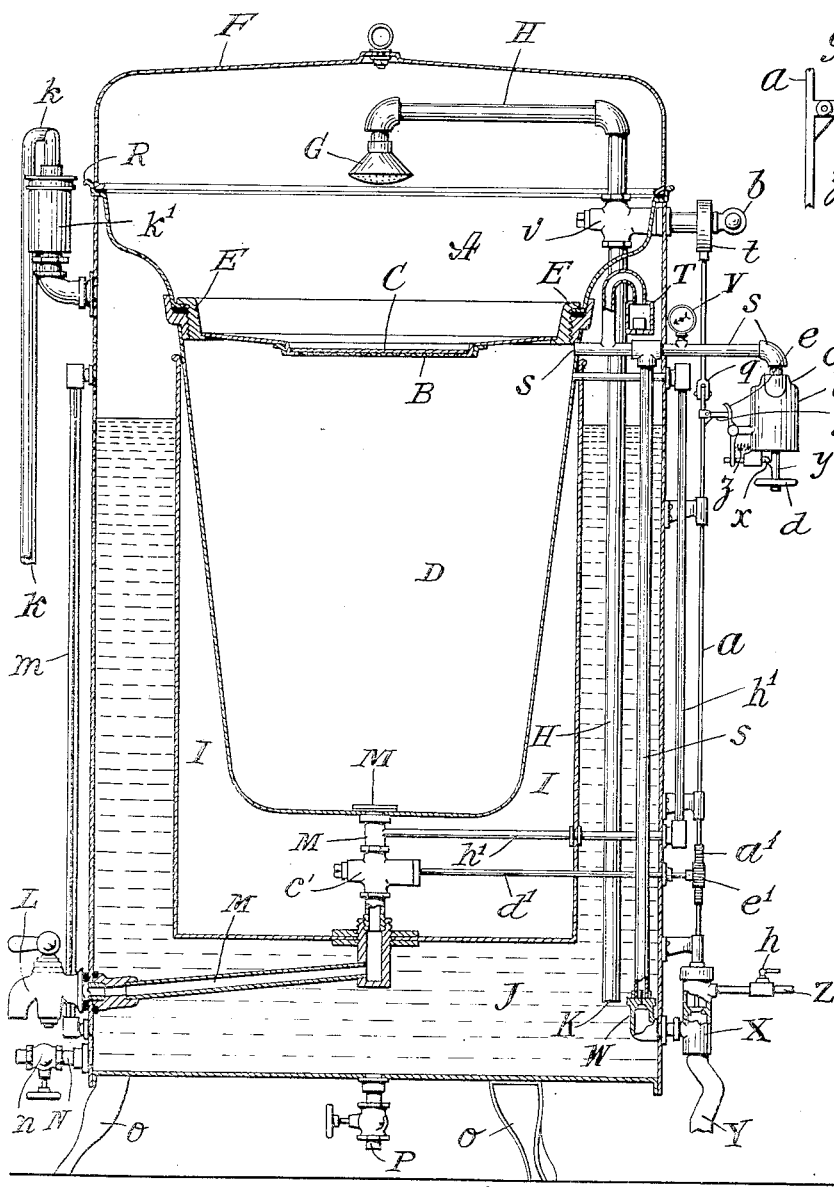
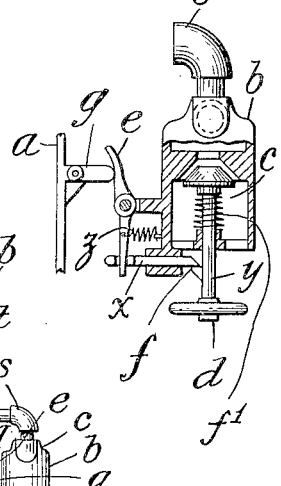

JOHN LOUIS MEYFARTH, OF BROOKLYN, NEW YORK.

COFFEE-URN.

1,376,287.  Specification of Letters Patent.  Patented Apr. 26, 1921.

Application filed July 25, 1918. Serial No. 246,661.

*To all whom it may concern:*

Be it known that I, JOHN LOUIS MEYFARTH, a citizen of the United States, residing at and whose post-office address is Number 726 Ocean avenue, borough of Brooklyn, in the city of New York, county of Kings, and State of New York, have invented new and useful Improvements in Coffee-Urns, of which the following is a specification.

My invention relates to improvements in coffee urns which embody automatic features and utilize a partial vacuum process for straining the coffee through filtering cloth or filtering paper in coffee urns in which the coffee is not exposed to the open air during the process of making or until drawn for use, and permits the use of pulverized coffee in large coffee-making urns.

I attain these objects by the apparatus illustrated in the accompanying drawing, in which—

Figure 1 is a vertical section of the entire apparatus; Fig. 2 is an enlarged view of the mechanism provided to relieve the vacuum and permit the drawing off of the coffee.

Similar letters refer to similar parts throughout the several views.

My coffee urn comprises the receptacle, A, in which the ground coffee is placed. The receptacle, has an opening, B, in its bottom which is covered by the filtering cloth or paper, C, and the receptacle rests upon and covers the jar, D, into which liquid coffee in the receptacle passes through the filtering cloth or paper, C. The receptacle, A, is joined to the jar, D, in an airtight manner shown at E, and has a cover, F, which closes its top, at R, and prevents the coffee coming into contact with the atmosphere in the coffee-making. Boiling water is supplied to the receptacle, A, through the nozzle, G, from pipe, H. The boiling water supply is contained in the chamber, J, the water being heated by any of the usual methods, as by a steam coil within the chamber, J, or by gas or other heat applied to it. The boiling water passes from the chamber, J, into the pipe, H, at K. The jar, D, is surrounded by an air space, I, and is supplied with means for drawing off the coffee as required for use, as one or more faucets, one of which is shown at L, connected with the jar, D, by the pipe, M. The coffee urn is supplied with legs, O, or other convenient means for supporting it. The water chamber, J, has an outlet as at P for drawing off the water when it is desired to clean or repair the apparatus.

The apparatus is supplied with the pipe, S, which connects with the jar, D, at or near its upper part, and extends to a sewer outlet as at Y, and is fitted with a check valve at some convenient point, as at W, and an aspirator as at X. The apparatus is also supplied with the rod, a, which has the joint, q, and the rack, a', and at its lower end, at X, forms a shut-off valve at the aspirator. At its upper end the rod is connected with the cam, t, firmly fixed to the arm of the shut-off valve, v, the valve, v, and the cam, t, being operated by the handle, b. The pipe, S, at some point beyond the check valve, W, is connected with the aspirator, X, and the latter is connected with a water supply, Z, which has a valve, h, normally open. The pipe, S, is supplied with the extension, b', which has the hand-controlled self-closing valve, c, opened by the handle, d. The rod, a, is supplied with an arm, g, which operates the lever, e, and the catch, x, which extends to the shaft, y, of the valve, c. The shaft, y, has the abutment, f, against which the catch, x, is normally held in abutting position by the spring, z. The water chamber, J, is connected with a water supply, as at n, and has the gage, m, which indicates the quantity of water in the chamber, j, and the relief or safety outlet, k, supplied with a safety governor, k'.

The coffee outlet, pipe, M, of the jar, D, is supplied with the shut-off valve, c', operated by the shaft, d', fitted with a pinion, e', which meshes with the rack, a', the valve being opened and closed by the movement of the rod, a. The coffee jar, D, is supplied with the gage, h', which indicates the amount of the coffee supply in the jar, D.

In the operation of my apparatus, the ground coffee is placed in the receptacle, A, and boiling water supplied through the pipe, H, passes through the nozzle, G, the water being turned on or off by operating the valve, v, by the handle, b. With the operation of the handle, b, which opens the valve, v, the shut-off valve, X, is also concurrently opened, allowing the entrance of water through the supply, Z, to the sewer outlet, Y. The action of the water passing through the aspirator and valve, at X, to the waste, Y, creates a partial vacuum in the pipe, S, and in the jar, D, to assist and facilitate the straining of the liquid coffee from the receptacle, A, through the filter cloth or paper, and permits the use of pulverized coffee. The extent of the vacuum is regulated by the governor, T, and the amount of the vacuum is indicated by the gage, V.

The act of turning the handle, b, which opens the valve, v, and admits boiling water to the receptacle, A, concurrently moves the rod, a, and the rack, a', which concurrently closes the valve, c', thereby shutting off air leaks at the faucets, L, and other openings beyond the valve, c', during the time the vacuum-producing mechanism is in operation; when the boiling water supply is turned off, the concurrent movement of the rod, a, and the rack, a', concurrently opens the valve, c'.

During the period of time the boiling water is entering the receptacle, A, and the aspirator and the vacuum-producing mechanism, at X, are in operation and producing a partial vacuum in the jar, D, the valve, c, is closed. After the coffee is made and is ready for use in the jar, D, the partial vacuum in the jar, D, unless relieved, would prevent the drawing off of the coffee at the faucets, L. When it is desired to relieve the vacuum in the jar, D, to draw off the coffee for use, the valve, c, is opened by pulling down the handle, d, and this valve is held open by the abutment, f, abutting against the catch x. When the handle, b, is operated to turn on the boiling water supply, the movement of the arm, g, on the rod, a, acts on the lever, e, which withdraws the catch x from contact with the abutment, f, and permits the valve, c, to close, the valve, c, being self-closing by the action of the spring, f'.

The operation of the handle, b, which turns on or off the boiling water for the coffee-making, concurrently opens and shuts the shut-off valve, at X, and concurrently puts the aspirator and the vacuum-producing mechanism, at X, in and out of operation.

Without departing from my invention, the boiling water supply for the coffee-making may be supplied from a heater (or any source) which is separated from the rest of the apparatus; and from such an independent water-heater boiling water for coffee-making in more than one of my coffee-making urns may be supplied. If boiling water is obtained independently of the coffee-making apparatus proper, the air space, I, about the jar, D, may be omitted and the coffee in the jar, D, is then kept hot by boiling water in the chamber, J, which in such construction immediately surrounds the jar, D. In this case the water if at boiling temperature, should be introduced around the jar after the making of the beverage is completed and the vacuum has been broken. If water surrounding and in direct contact with the jar is in place while the vacuum is on, then such water should be materially below the boiling point, as otherwise the heat therefrom would cause the beverage in the jar to foam and more or less of it would be carried off through pipe S and the waste pipe Y.

The vacuum may be produced by other means than that shown and described above without departing from my invention; as, for example, by an electric vacuum pump which may be put into and out of operation by the turning of the handle, b, such pump being put into operation when the boiling water supply is turned on, and put out of operation when said water supply is turned off.

I claim:

1. In a coffee-making urn connected with a boiling water supply, the combination of a ground-coffee receptacle having a discharge-opening covered with filtering material, a beverage jar having an air-tight connection with said opening and means for drawing liquid coffee, means for producing a vacuum in said jar, means for opening the jar to the atmosphere, and means actuated by the operation of the vacuum-producing means, for effecting the closing of communication between the atmosphere and the jar.

2. In a coffee-making urn connected with a boiling water supply, the combination of a ground-coffee receptacle, having an opening in its bottom covered by a filtering material, a dispensing jar connected in an air-tight manner with said filtering opening, and supplied with means for drawing the liquid coffee for use, and a vacuum-producing mechanism connected with said dispensing jar which is automatically put into operation when the boiling water supply is turned on, and is automatically put out of operation when the boiling water supply is turned off.

3. In a coffee-making urn connected with a boiling water supply, the combination of a ground-coffee receptacle having a cover and an opening in its bottom covered by filtering material, a dispensing jar connected in an air-tight manner with said filtering opening and supplied with means for drawing the liquid coffee for use, a vacuum-producing mechanism connected with said dispensing jar, and automatic means for regulating the degree of vacuum in said dispensing jar.

4. In a coffee-making urn connected with a boiling water supply, the combination of a ground-coffee receptacle having an air-tight cover and an opening in its bottom covered by filtering material, a dispensing jar connected in an air-tight manner with said filtering opening and supplied with means for drawing the liquid coffee for use, a vacuum-producing mechanism connected with said dispensing jar, and automatic means for regulating the degree of vacuum in said dispensing jar.

5. In a coffee-making urn connected with a boiling water supply, the combination of a ground-coffee receptacle having a cover and an opening in its bottom covered by filtering material, a dispensing jar connected in an air-tight manner with said filtering opening and supplied with means for drawing the liquid coffee for use, a vacuum-producing mechanism connected with said dispensing jar, and means for reducing the vacuum in said dispensing jar which is automatically closed when the vacuum-producing mechanism is put into operation.

6. In a coffee-making urn connected with a boiling water supply, the combination of a ground-coffee receptacle having an air-tight cover and an opening in its bottom covered by filtering material, a dispensing jar connected in an air-tight manner with said filtering opening and supplied with means for drawing the liquid coffee for use, a vacuum-producing mechanism connected with said dispensing jar, and means for reducing the vacuum in said dispensing jar which is automatically closed when the vacuum-producing mechanism is put into operation.

7. In a coffee-making urn connected with a boiling water supply, the combination of a ground-coffee receptacle having a cover and an opening in its bottom covered by filtering material, a dispensing jar connected in an air-tight manner with said filtering opening and supplied with means for drawing the liquid coffee for use, a vacuum-producing mechanism connected with said dispensing jar, automatic means for regulating the degree of vacuum in said dispensing jar, and means for reducing the vacuum in said dispensing jar which is automatically closed when the vacuum-producing mechanism is put into operation.

8. In a coffee-making urn connected with a boiling water supply, the combination of a ground-coffee receptacle having an air-tight cover and an opening in its bottom covered by filtering material, a dispensing jar connected in an air-tight manner with said filtering opening and supplied with means for drawing the liquid coffee for use, a vacuum-producing mechanism connected with said dispensing jar, automatic means for regulating the degree of vacuum in said dispensing jar, and a valve for reducing the vacuum in said dispensing jar which is automatically closed when the vacuum-producing mechanism is put into operation.

9. A coffee urn having a boiler chamber, a beverage jar having a faucet controlled discharge at its lower end, a receptacle forming a closure for the boiler chamber and the jar and bearing an air-tight relation to the latter and provided in its bottom with a filter-covered opening for discharge into the jar, an air-tight cover for the receptacle, a valve-controlled pipe communicating at its lower end with the boiler chamber below the water level thereof and at its upper end arranged to discharge into said receptacle, a valve-controlled waste pipe, a pipe connecting said waste pipe with the said jar, and means for simultaneously opening the valve of the pipe in the boiler and the valve of the said waste pipe to produce suction in the pipe connected to the jar for creating a vacuum in the latter.

10. A coffee urn having a boiler chamber, a beverage jar having a faucet controlled discharge at its lower end, a receptacle forming a closure for the boiler chamber and the jar and bearing an air-tight relation to the latter and provided in its bottom with a filter-covered opening for discharge into the jar, an air-tight cover for the receptacle, a valve-controlled pipe communicating at its lower end with the boiler chamber below the water level thereof and at its upper end arranged to discharge into said receptacle, a valve-controlled waste pipe, a pipe connecting said waste pipe with the jar, means for simultaneously opening the valve of the pipe in the boiler and the valve of the said waste pipe to produce suction in the pipe connected to the jar for creating a vacuum in the latter, and means for limiting the degree of vacuum produced in the jar.

11. A coffee urn having a boiler chamber, a beverage jar having a faucet controlled discharge at its lower end, a receptacle forming a closure for the boiler chamber and the jar and bearing an air-tight relation to the latter and provided in its bottom with a filter-covered opening for discharge into the jar, an air-tight cover for the receptacle, a valve-controlled pipe communicating at its lower end with the boiler chamber below the water level thereof and at its upper end arranged to discharge into said receptacle, a valve-controlled waste pipe, a pipe connecting said waste pipe with the said jar, a valve controlling the faucet controlled discharge pipe of the jar, and means for simultaneously opening the valve of the pipe in the boiler and the valve of the said waste pipe and closing the said valve of the faucet controlled pipe and for simultaneously reversing the positions of said valves.

12. A coffee-making urn comprising a shell, a ground-coffee receptacle in the shell, provided with a filter-covered opening, a jar within the shell for receiving the discharge through the said opening and having an air-tight connection with the receptacle, means for supplying boiling water to the ground-coffee receptacle, means for opening the jar to the atmosphere, means independent of boiling water in the urn for producing a vacuum in the jar and means actuated by the operation of the vacuum-producing means, for effecting the closing of communication between the atmosphere and the jar.

13. A coffee-making urn comprising a shell, a ground-coffee receptacle in the shell, provided with a filter-covered opening, a jar within the shell for receiving the discharge through the said opening and having an air-tight connection with the receptacle, a valve-controlled passage-way for supplying boiling water to the said receptacle, a passageway connected to the jar, valve-controlled means for producing a vacuum in the last-named passageway and the jar, and means for simultaneously opening or closing the valves of said passageways to start or stop the coffee-making operation.

14. A coffee-making urn comprising a shell, a ground-coffee receptacle in the shell, provided with a filter-covered opening, a jar within the shell for receiving the discharge through the said opening and having an air-tight connection with the receptacle, means for supplying boiling water to the ground-coffee receptacle, means for producing a vacuum in the jar, faucet controlled means for drawing off beverage from the jar, means for opening the jar to the atmosphere to permit coffee to be drawn off through the faucet, and means actuated by the operation of the vacuum-producing means, for effecting the closing of the vent to the atmosphere, from the jar.

JOHN LOUIS MEYFARTH.

Witnesses:
F. A. SPAETH,
SAMUEL L. WATSON.